Sept. 28, 1926.

H. H. FERNSTROM

DRILL PRESS

Filed June 19, 1922

Inventor.
Herman H. Fernstrom,
By W. P. Doolittle
Atty.

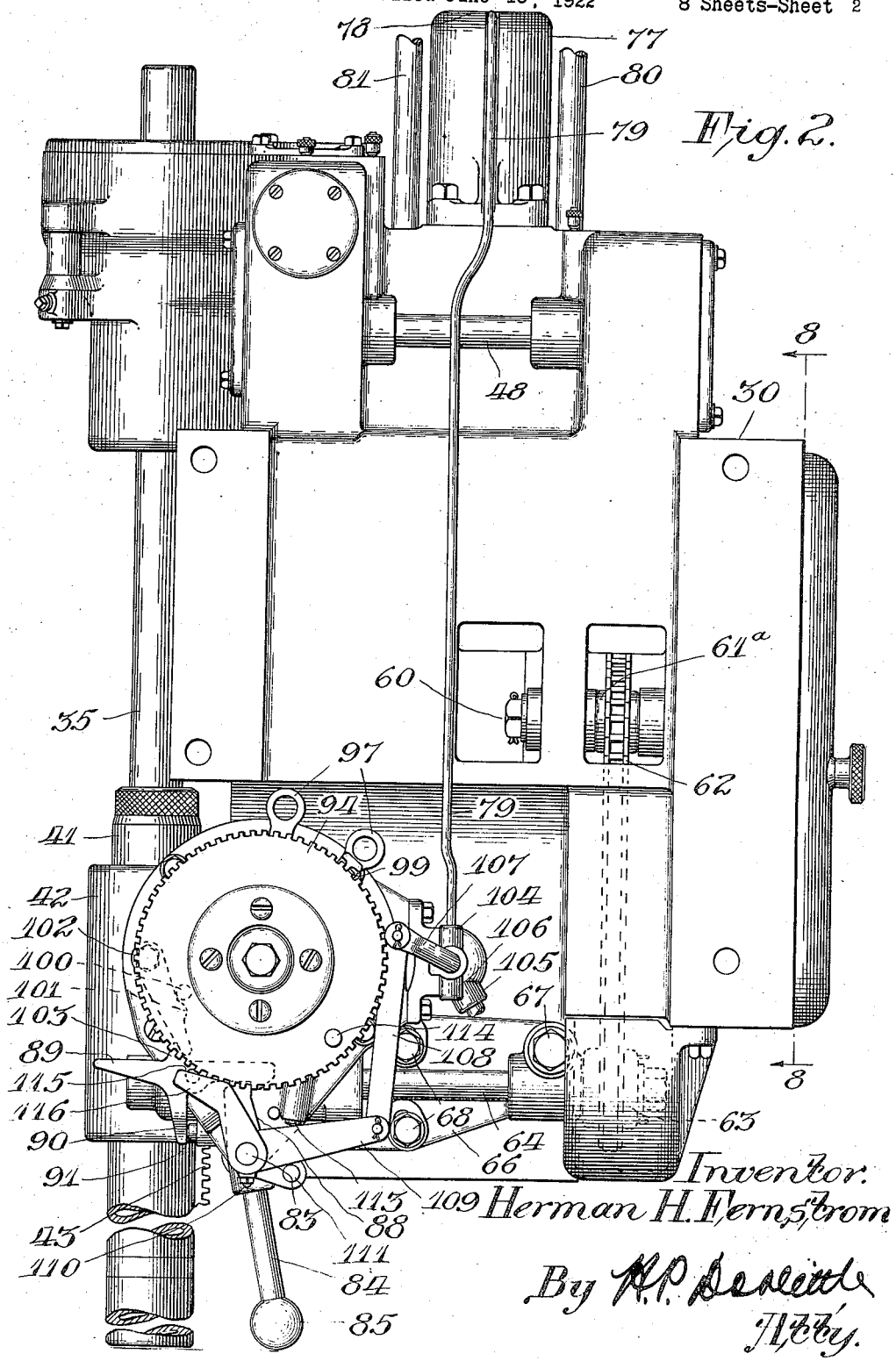

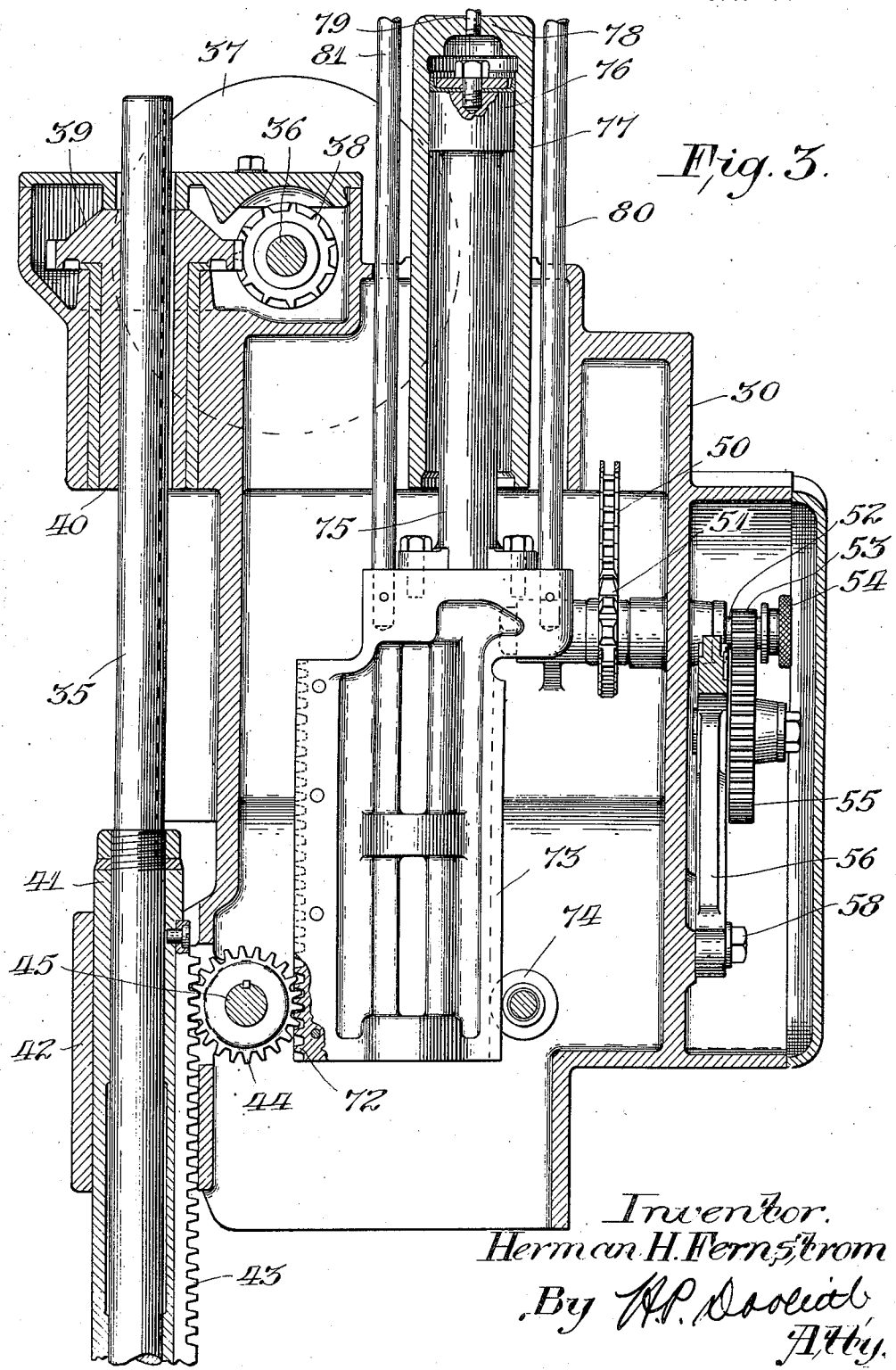

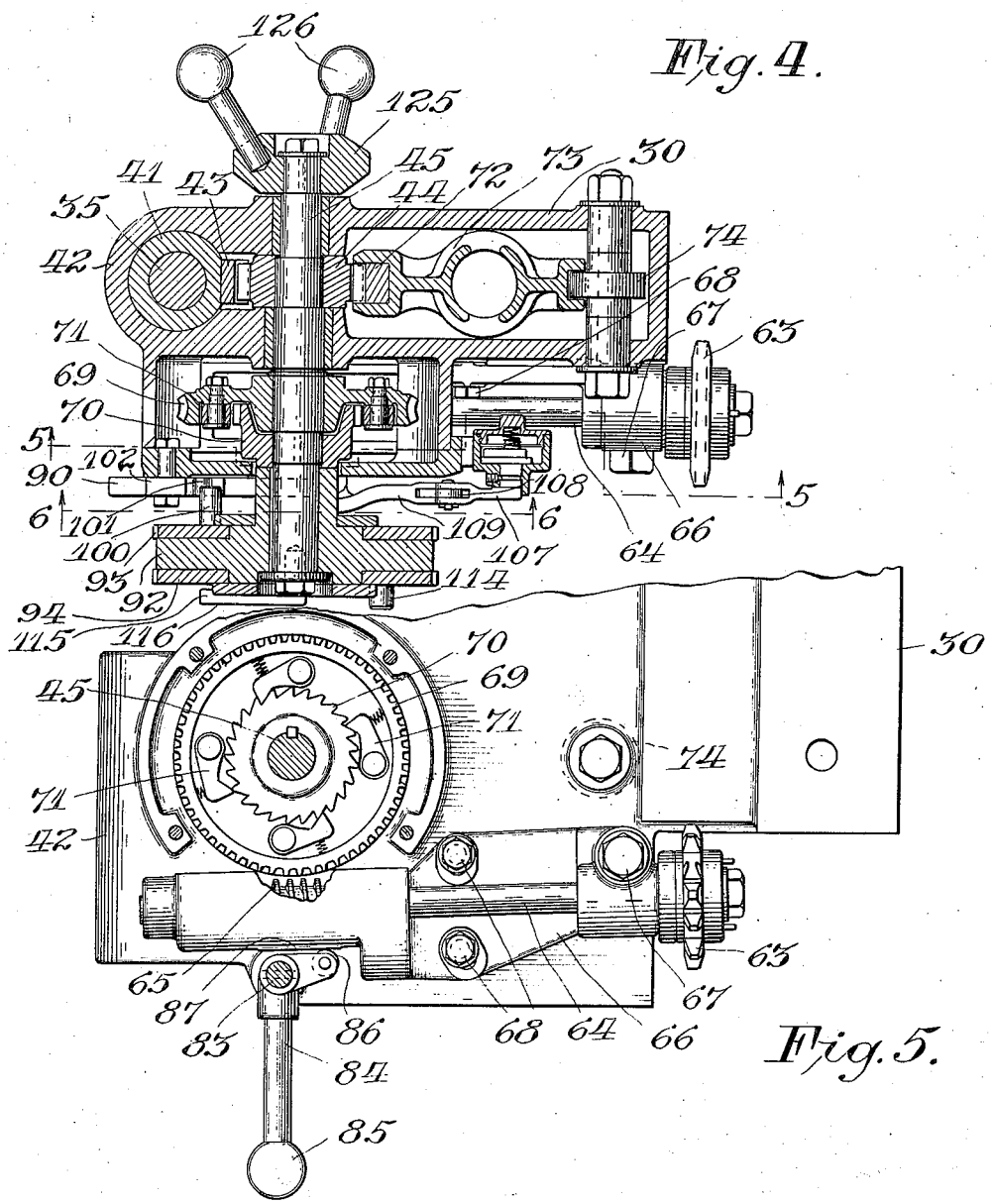

Sept. 28, 1926.

H. H. FERNSTROM

DRILL PRESS

Filed June 19, 1922

Inventor.
Herman H. Fernstrom,
By R.P. Devereb
Atty.

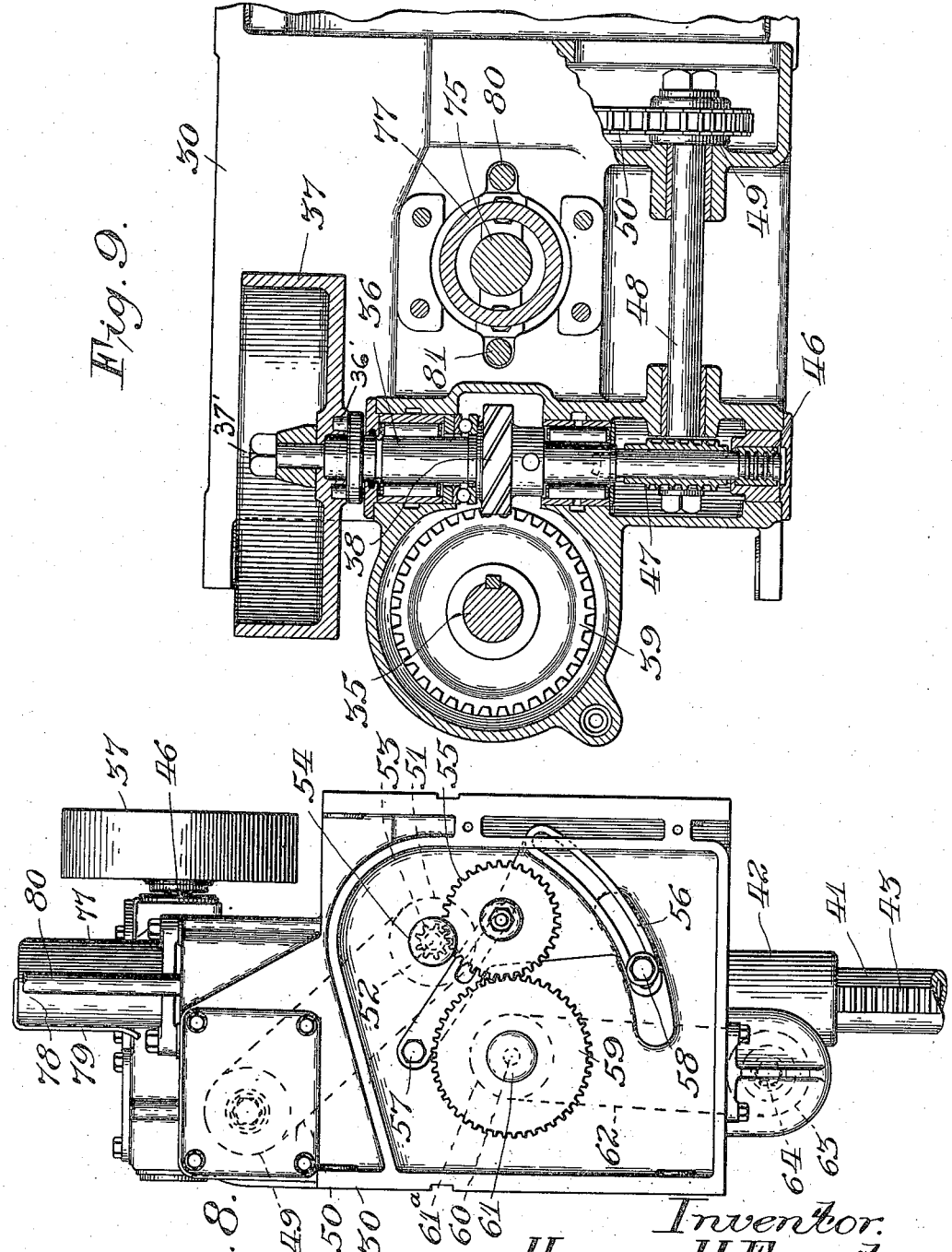

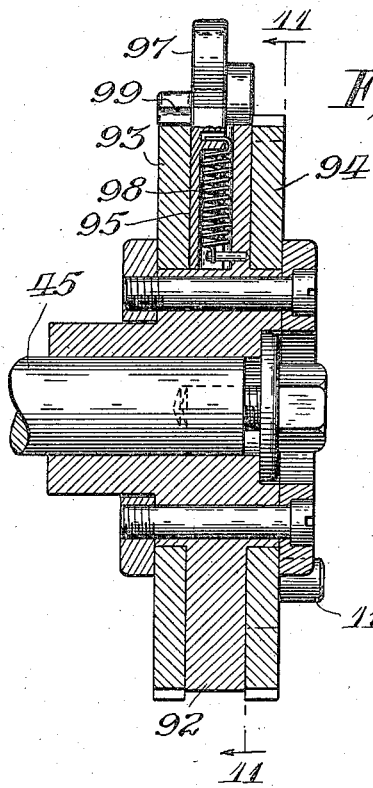
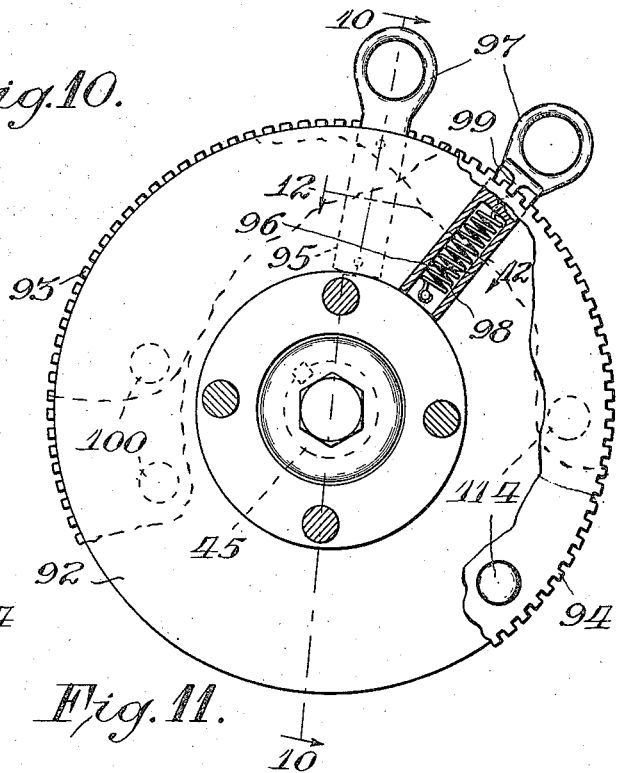
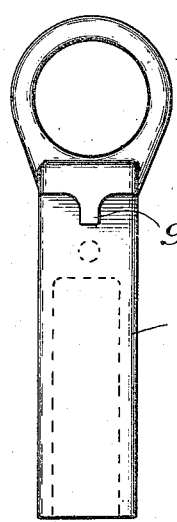
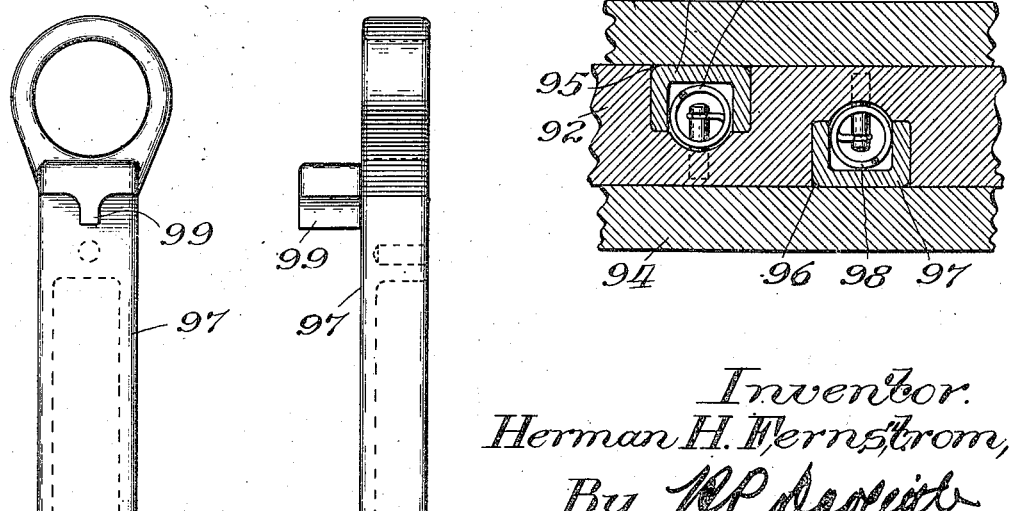

Sept. 28, 1926.

H. H. FERNSTROM

DRILL PRESS

Filed June 19, 1922     8 Sheets-Sheet 8

Inventor:
Herman H. Fernstrom,
By [signature]
Atty.

Patented Sept. 28, 1926.

1,601,113

UNITED STATES PATENT OFFICE.

HERMAN H. FERNSTROM, OF CHICAGO, ILLINOIS, ASSIGNOR TO INTERNATIONAL HARVESTER COMPANY, OF CHICAGO, ILLINOIS, A CORPORATION OF NEW JERSEY.

DRILL PRESS.

Application filed June 19, 1922. Serial No. 569,341.

My invention relates to drill presses and particularly to a multiple spindle drill and has among its objects to provide a semi-automatic drill press that is set in operation by the operator after the work has been clamped in position on the table, feeds through the work to the required depth and then automatically withdraws the tool from the work, retaining the tool in withdrawn position until the operator again starts the cycle of operations.

Another object is to provide a drill press having a vertical spindle carrying a cutting tool that is quickly advanced into contact with the work by gravity or otherwise, is then automatically advanced by a power feeding device to the required depth and then automatically withdrawn from the work.

Another object is to provide a change speed gear in a drill press giving the spindle a wide range of feeds thereby adapting the press to do a wide variety of work.

Another object is to provide a drill press in which the spindle is given a wide range of speeds and a wide range of feeds with each speed.

Yet another object is to provide an adjustable feed mechanism in a semi-automatic drill press whereby not only the rate of feed may be varied but the total feed may be adjusted to suit the size and depth of the work.

Still another object is to provide a multiple spindle drill comprising a plurality of separate units, each unit having an independently driven spindle and feed mechanism, and adapted to be assembled with other similar units to form a unitary machine having any desired number of spindles.

Another very important object of my invention is to provide what I term a floating or vertically movable spindle adapted to float or be supported on an air cushion when in retracted position and, on release of the air, to feed the tool rapidly by gravity into contact with the work.

Another object is to provide a feeding means for a drill press adapted to advance the cutting tool rapidly when it is not cutting and to automatically feed the tool at a predetermined slower speed while it is cutting.

Another object is to provide an air actuated controlling means for rapidly feeding a cutting tool to the work and for retracting the tool when the cutting operation has been completed.

Another object is to provide a combined mechanical and air actuated feeding and control mechanism for a cutting tool.

Another object is to provide a positive mechanical feed for advancing a cutting tool through the work but which will permit the tool to advance independently of the feed when not operating on the work.

The above and other objects are attained by the embodiment of my invention hereinafter described and illustrated in the accompanying drawings in which—

Fig. 2 is an enlarged side elevation of a single unit looking from right to left of Fig. 1;

Fig. 3 is a vertical section through one of the units taken substantially on the line 3—3 of Fig. 1;

Fig. 4 is a horizontal section taken substantially on the line 4—4 of Fig. 1 showing the spindle feeding and control mechanism;

Fig. 5 is a sectional view taken substantially on the line 5—5 of Fig. 4 showing the ratchet drive for feeding the spindle to the work;

Fig. 8 is a rear view looking in the direction of the arrows 8—8 of Fig. 2 and showing the change speed gears by which a wide range of feeds is secured;

Fig. 9 is a horizontal section taken on line 9—9 of Fig. 1;

Fig. 10 is a section on the line 10—10 of Fig. 11 showing the trip index head;

Fig. 11 is an elevation partly in section on the line 11—11 of Fig. 10 showing the index plates in different positions of adjustment;

Fig. 12 is an enlarged detail view taken on the line 12—12 of Fig. 11;

Figs. 13 and 14 are detail views of the index fingers or plungers; and

Figure 1:
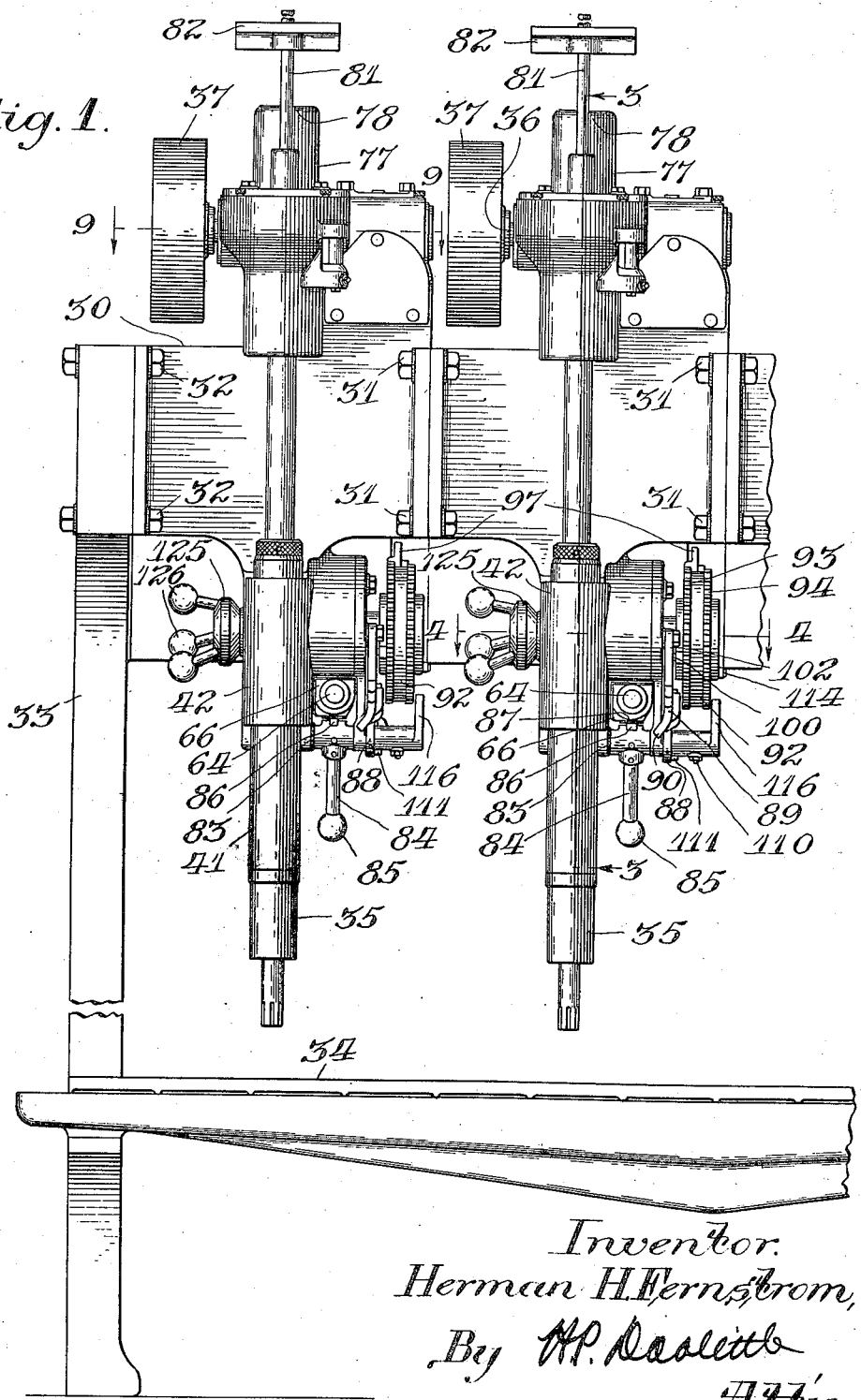
Fig. 1 is a front elevation of part of a four-spindle drill press embodying my invention.

In Fig. 1 I have shown the two left hand units and supporting column of a four spindle drill press, it being understood that the two right hand units and supporting columns are similar to those illustrated. Each unit comprises a frame 30 secured together by bolts 31 to form a machine of any desired number of units, the outer side of the end frames being secured by bolts 32 to supporting columns 33. A work table 34 is carried by the columns in position to hold the work beneath the spindles 35 which are rotatably and slidably mounted in the respective frames.

Referring to Figs. 2, 3 and 9, a spindle drive shaft 36 having a belt pulley 37 is journaled in each frame and carries a spiral gear 38 meshing with a spiral gear 39 having an elongated sleeve 40 in which the drill spindle 35 is splined. The pulley 37 is detachably secured to the shaft 36 by pins 36' and bolt 37' and is one of several pulleys of different sizes by means of which the spindle is driven at different speeds. At its lower end the spindle is rotatably mounted in a sleeve 41 which is slidable in a bearing 42 on the frame. The sleeve 41 carries a rack 43 meshing with a gear 44 keyed to the spindle feed shaft 45. Rotation of the gear 44 in opposite directions raises or lowers the drill spindle 35 through the rack 43 and sleeve 41 as will presently be described.

The spindle drive shaft 36 extends beyond the spiral gear 38 and at its farther end is journaled in a thrust bearing 46 and has keyed thereto a worm 47 meshing with a wheel fixed to one end of the feed drive shaft 48 on the other end of which a sprocket 49 is secured. A chain 50 engages the sprocket 49 and a sprocket 51 secured to the change speed shaft 52 which also carries a gear 53 detachably secured thereto by a knurled nut 54, as best shown in Figs. 3 and 8. The gear 53 meshes with an idler 55 carried by the adjusting arm or bracket 56 pivotally connected to the frame by bolt 57 and at its other end having an arcuate slot engaged by a bolt 58 for securing the bracket in adjusted position. The idler 55 meshes with a gear 59 detachably secured to a short shaft 60 by means of a knurled nut 61 similar to the previously described nut 54.

Referring to Fig. 2, the shaft 60 carries a sprocket 61ª engaged by a chain 62 and driving a sprocket 63 carried by one end of the worm drive shaft 64 to the opposite end of which the feed worm 65 is secured as best shown in Fig. 5. The shaft 64 is rotatably mounted in a bearing frame 66 which is pivotally connected to the main frame by a bolt 67 about which the frame has a slight oscillatory movement limited by the bolts 68 engaging in arcuate slots in the bearing frame. The worm 65 is adapted to be moved into and out of mesh with a worm wheel 69 which is rotatably mounted on the spindle feed shaft 45 previously referred to. The shaft 45 has keyed thereto a ratchet 70 forming one element of a one-way clutch adapted to be engaged by a plurality of spring pressed pawls 71 carried by the worm wheel 69. As shown in Fig. 5, the ratchet 70 has twenty-five equally spaced teeth while the wheel 69 carries four equally spaced pawls only one of which will be in driving engagement with a tooth of the ratchet at any one time. This construction provides for one hundred different positions of engagement of the clutch and avoids excessive lost motion or shock when the feeding mechanism is engaged to feed the spindle through the work. It will be seen that when the worm 65 is thrown into engagement with the wheel 69, the clutch elements will be engaged to rotate the gear 44 to positively feed the spindle downward to the work but at the same time the spindle 35 may be fed down independently of the feed since the ratchet 70 will overrun the pawls 71.

Referring to Figs. 3 and 4, the gear 44 meshes with the spindle sleeve rack 43 on one side and on its opposite side engages a rack 72 carried by a counter weight 73 guided by a roller 74 to move vertically in the frame parallel to the spindle 35. At its upper end the counter weight carries a piston rod 75 having a piston head 76 slidable in a cylinder 77 secured to the frame 30. The cylinder has a head 78 to which the compressed air pipe 79 is connected. The counter weight carries a pair of rods 80, 81 which extend beyond the frame 30 on opposite sides of the cylinder 77 and at their upper ends carry a plate 82 adapted to receive additional counter weights. Referring to Fig. 3, the racks 43 and 72 engage opposite sides of the gear 44 so that rotation of the gear to feed the spindle downward will move the counter weight upward and, conversely, admission of compressed air or other fluid under pressure to the cylinder 77 will force the counter weight downward and raise the spindle 35. The counter weight is so proportioned that its weight, together with that of the piston and additional weights, 82 will be somewhat less than the weight of the spindle 35 and sleeve 41 so that when the compressed air is let out from the cylinder 77 the spindle will descend by gravity, under control of the escaping air, and raise the counter weight, the ratchet 70 overrunning the pawls 71.

Referring to Figs. 2, 4, 5, 6 and 7, I will now describe the means for positively feeding the tool carrying spindle 35 downwardly through the work. Referring first to Figs. 2 and 5, a short shaft 83 is supported on the frame and has a bell crank 84 keyed thereto, one arm of the crank providing a handle 85 and the other arm carrying a roller 86 engaging a flat surface 87 on the bearing frame 66. When the handle 85 is pushed to the right in Fig. 5 the frame will be oscillated about the bolt 67 and the worm 65 moved into engagement with the wheel 69. The shaft 83 has keyed thereto a latch 88, (Figs. 2, 6 and 7) which moves under the spring pressed trip 89 pivoted on the frame and having a lip engaging the latch to hold the control lever 85 and worm 65 in engaged position. The trip 89 has a depending finger 90 engaged by a spring pressed plunger 91 which holds the lip in engagement with the latch. The worm now remains in engagement with the wheel 69 and through the clutch 70, 71 rotates the gear 44 and feeds the spindle downward until the worm and wheel are disengaged.

Figure 6:
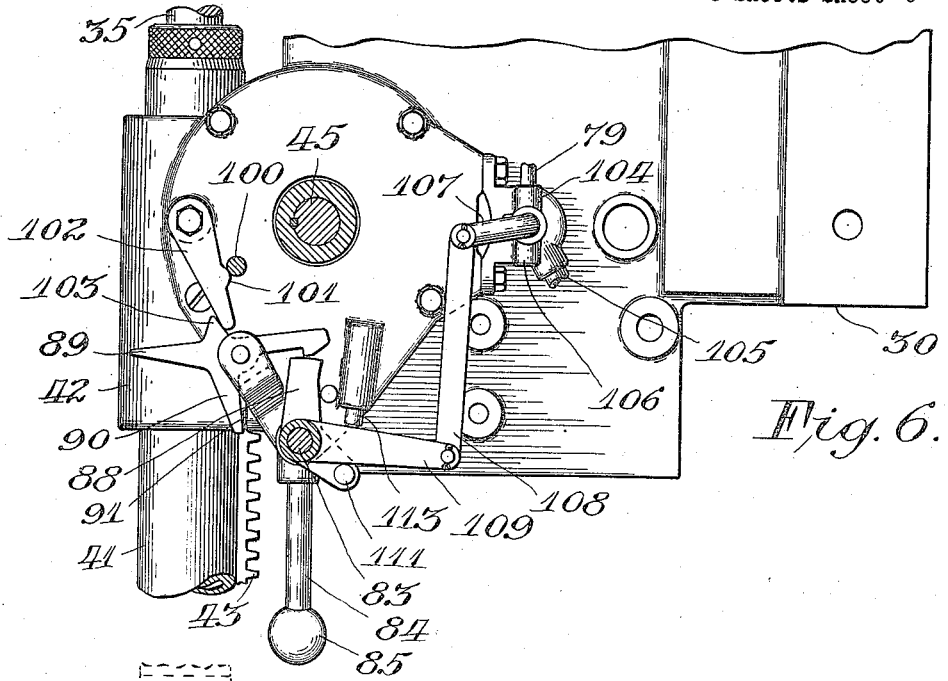
Fig. 6 is a detail view of the spindle controlling mechanism looking in the direction of the arrows 6—6 on Fig. 4.
Figure 7:
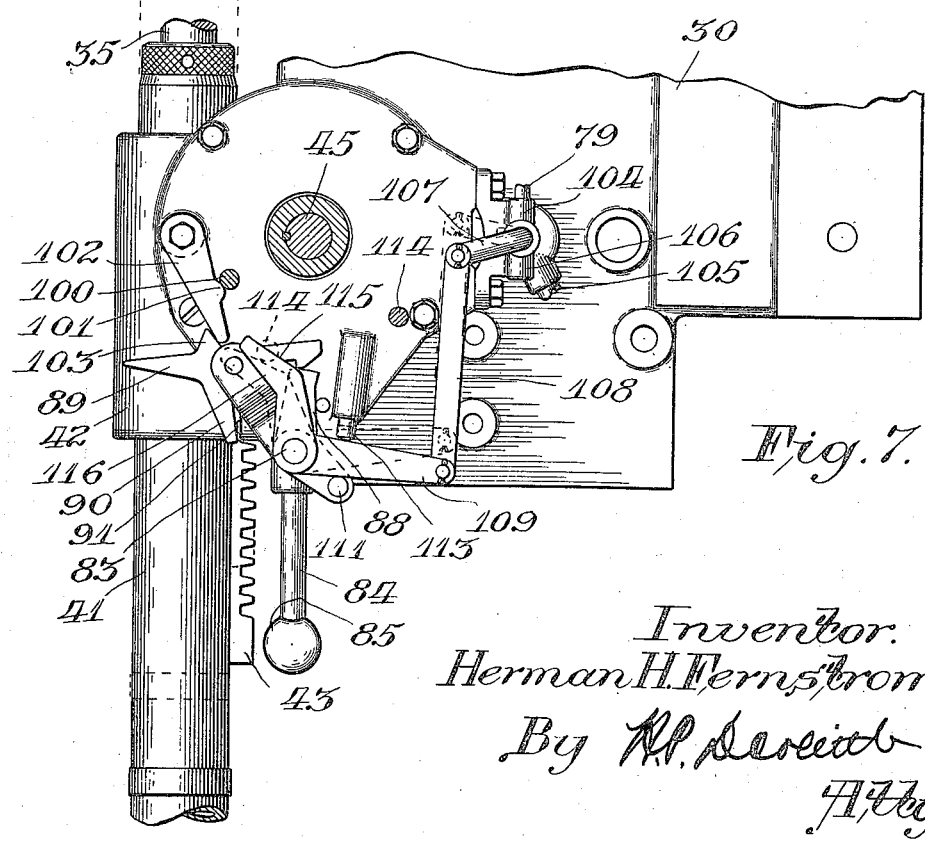
Fig. 7 is a view similar to Fig. 6 but showing the cam of the valve control lever and pin for actuating it.

While the handle or control lever 85 is manually operated, I have provided an adjustable automatic means for releasing the handle and disengaging the worm from the wheel when the spindle has been fed downward a predetermined distance which means I will now describe. The spindle feed shaft 45 extends beyond the clutch and has keyed at its outer end an index head 92 upon which two index plates 93, 94 are rotatably mounted, (see Figs. 4 and 10). The index plates are adjustable on the head 92, the plate 93 controlling downward feed of the spindle and the plate 94 controlling the distance the spindle is moved upward when the worm and wheel are disengaged as will presently be described. The index head has a pair of radial slots 95, 96 in each of which a plunger 97 is yieldably held by a coil spring 98 as best shown in Figs. 10, 11 and 12. The index plates are provided with teeth on the outer periphery in which a lug 99 on the plunger is adapted to engage. When a plunger 97 is pulled out against the tension of its spring 98, the lug 99 will be withdrawn from the teeth in the plate whereupon the plate may be turned to different positions of adjustment on the head 92. When the plate is in the desired position, the plunger is released and the lug or tongue engaging between the teeth holds the plate in fixed relation to the head. Referring to Figs. 4, 6 and 7, the plate 93 carries a pin or stop 100 adapted to engage a cam 101 on a trigger 102 pivoted at one end on the frame and at its other end engaging a projection 103 on the trip 89. When the pin 100 engages the cam 101 it will force the lower end of the trigger 102 to the left, (Figs. 6 and 7) raising the trip 89 and releasing the latch 88 permitting the lever 85 to swing downward and the worm 65 to drop out of engagement with the wheel 69. Since the pin 100 and plate 93 are adjustable on the index head, the plate may be so adjusted that the pin will engage the cam 101 and release the feeding mechanism when the spindle has been fed downward to any desired depth.

Figure 15:
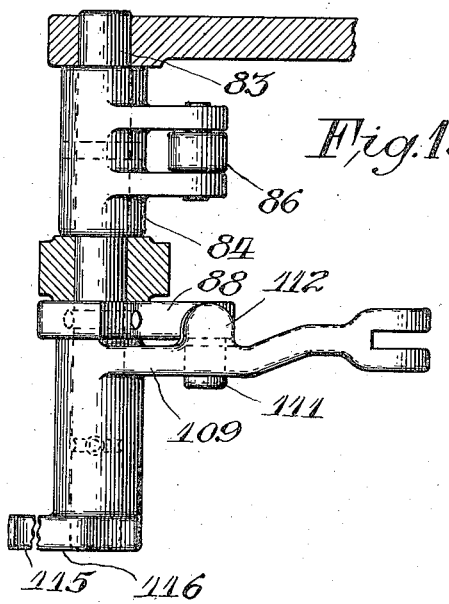
Figs. 15 to 20 are details of parts of the air valve operating means and trip mechanism.
Figures 17, 18:
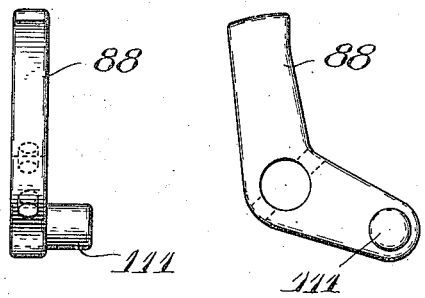
Figure 19:
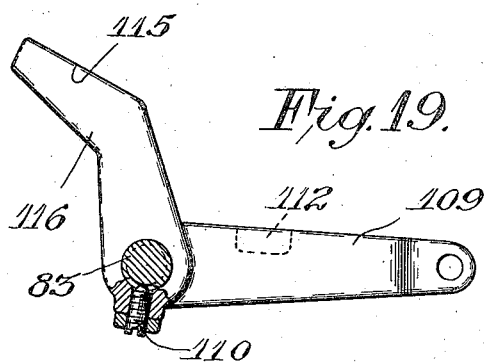
Figure 20:
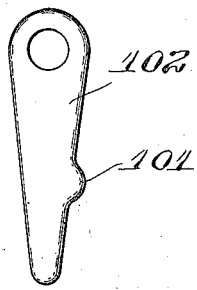
Figure 16:
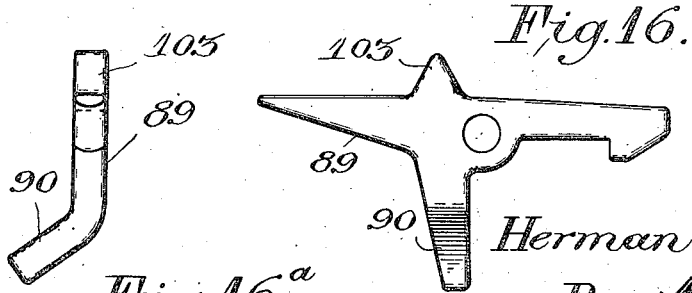

I will now describe the means for automatically raising the spindle when the feeding mechanism has been released. Referring to Figs. 2, 6 and 7, the compressed air pipe 79 is connected to the outlet 104 of a threeway valve having an inlet 105 for compressed air and an exhaust port 106. This valve is controlled by a lever 107 connected by a link 108 to the air valve control lever 109 which is rotatably mounted on the shaft 83 by means of a set screw 110 engaging in a groove in the shaft as best shown in Figs. 15 and 19. The latch 88 has a bent arm carrying a pin 111 adapted to engage the under side of the air valve control lever 109. The lever 109 has a laterally extending lug 112 engaged by a spring pressed plunger 113 which tends to force the lever downward and open the three-way valve to admit compressed air to the cylinder 77 through the pipe 79. When the lever 85 is moved to the position shown in Fig. 2 in which the worm 65 is engaged with the wheel 69, the pin 111 will raise the lever 109 and open the exhaust port 106 so that air is exhausted from the cylinder 77 as the spindle is fed downward and the counter weight and piston move upward. The feed shaft 45 now continues to rotate and feed the spindle downward until the stop 100 engages the trigger 102 to release the trip 89 and latch 88 which disengages the feed worm. As the handle 85 swings downward, the plunger 113 forces the lever 109 downward to the position shown in Fig. 6 and to the full line position shown in Fig. 7 which closes the exhaust port 106 and opens the port 105 admitting air under pressure above the piston 76 forcing it and the counter weight down and raising the drill spindle. As previously described, the index plate 94 is adjustable on the head 92 and carries a pin or stop 114 which rotates in the path of a cam surface 115 on an arm 116 of the air valve control lever As the spindle is being raised, the index plate 94 rotates clockwise, (Fig. 2) until the pin 114 strikes the cam surface 115 which rocks the valve control lever on the shaft 83 and closes the air inlet port 105 leaving the cylinder 77 filled with air and providing a cushion upon which the spindle rests when in raised position. Fig. 7 shows in dotted lines the position to which the valve lever is raised when the port 105 is closed but the port 106 not yet open. In this position the pin 114 remains in contact with the cam surface 115 so that if there is any leakage of air to or from the cylinder 77, the pin will slightly shift on the cam surface and, correspondingly, shift the valve lever so as to retain the spindle in elevated position.

In the operation of my invention, the work will be secured to the table 34 beneath the spindles 35, the operator will then press over the handle 85 to throw the worm 65 into engagement with the wheel 69 at the same time opening the exhaust port of the air valve. The spindle and sleeve then being heavier than the counter weight and piston, will feed by gravity until the tool comes in contact with the work. The ratchet 70 during this time is overrunning the pawls 71. However, as soon as the tool strikes the work and the spindle comes to rest, one of the pawls 71 will engage a tooth on the ratchet to positively rotate the shaft 45 and gear 44 and feed the tool through the work. This continues until the spindle has been fed to the depth determined by the position of the plate 93 on the index head when the stop 100 engages the trigger 102 and releases the feed mechanism. This same movement closes the exhaust port of the air valve and opens the inlet port 105 admitting air to the cylinder, forcing the piston and counter weight downward and raising the spindle from the work until the stop 114 engages the cam surface 115 closing the air valve and holding the spindle in elevated position.

Referring to Fig. 8, the gears 52, 55 and 59 provide a change speed mechanism whereby a wide range of feeds may be given to the spindle. The gears are removable from and interchangeable on their respective shafts and, together with a plurality of other similar gears of different sizes which are not illustrated, enable me to secure feeds of any desired amount per revolution of the spindle.

It is to be noted that each spindle and its feed mechanism is driven independently of the other spindles and forms a complete unit. It is also to be noted that each spindle has a wide range of feeds for each size of drive pulley 37 that may be used, so that I may secure almost an unlimited range of speeds and feeds, and in any class of work obtain the combination of feed and speed that will most efficiently do the work.

In addition to the automatic feed of the drill spindle, I have provided a means whereby it may be fed manually to the work if desired. Referring to Figs. 1 and 4, the shaft 45 extends beyond the frame and carries a collar 125 in which three ball handles 126 are secured. When it is desired to feed the spindle manually, the operator instead of throwing over the lever 85 may rotate the feed shaft 45 by means of the handle 126 and then retract the spindle by the same means.

While I have described my invention as a drill press, it is to be understood that the tool is not to be limited to drilling operations but may be used for boring, reaming or any other work adapted to a machine of this character. In the description and claims, I refer to the piston 76, cylinder 77 and the parts connected thereto and controlling their operation as "pneumatic means" for raising the spindle. It is to be understood however that the term "pneumatic" is used only in an illustrative sense and not as a limitation, and that any suitable fluid under pressure may be used in place of compressed air.

Having thus described my invention, what I claim as new and desire to secure by Letters Patent is:

1. In a device of the class described, a frame, a sleeve vertically slidable therein and carrying a rack, a tool carrying spindle journaled in the sleeve and slidable therewith, a counter weight lighter than said tool carrying spindle and slidable in the frame parallel to the sleeve and carrying a rack, a gear rotatably supported on the frame and engaging both racks, means for feeding the spindle downward to the work, and means for moving the counter weight downward to raise the spindle.

2. In a device of the class described, a frame, a sleeve vertically slidable therein and carrying a rack, a tool carrying spindle journaled in the sleeve and slidable therewith, a counter weight lighter than said tool carrying spindle and slidable in the frame parallel to the sleeve and carrying a rack, a gear rotatably supported on the frame and engaging both racks, manually controlled means for feeding the spindle downward to the work, and means for moving the counter weight downward to raise the spindle.

3. In a device of the class described, a frame, a sleeve vertically slidable therein and carrying a rack, a tool carrying spindle journaled in the sleeve and slidable therewith, a counter weight lighter than said tool carrying spindle and slidable in the frame parallel to the sleeve and carrying a rack, a gear rotatably supported on the frame and engaging both racks, means for feeding the spindle downward to the work, and means automatically actuated when the spindle has been fed a predetermined distance for moving the counter weight downward to raise the spindle.

4. In a device of the class described, a frame, a sleeve vertically slidable therein and carrying a rack, a tool carrying spindle journaled in the sleeve and slidable therewith, a counter weight lighter than said tool carrying spindle and slidable in the frame parallel to the sleeve and carrying a rack, a gear rotatably supported on the frame and engaging both racks, means for feeding the spindle downward to the work, adjustable means for limiting the downward movement of the spindle, means for moving the counter weight downward to raise the spindle, and adjustable means for limiting the upward movement of the spindle.

5. In a device of the class described, a frame, a sleeve vertically slidable therein and having a rack on one side, a tool carrying spindle rotatably mounted in the sleeve and slidable therewith, means for rotating the spindle, a counter weight lighter than said tool carrying spindle and vertically slidable in the frame and having a rack, a gear engaging both racks, means for rotating the gear in one direction to feed the sleeve and spindle downward and raise the counter weight, and means for forcing the counter weight downward thereby rotating the gear in the opposite direction and raising the spindle and sleeve.

6. In a device of the class described, the combination of a frame, a sleeve vertically slidable therein, a tool carrying spindle journaled in the sleeve and slidable therewith, a shaft journaled in the frame and driving the spindle, a counter weight of less weight than the spindle and sleeve vertically slidable on the frame, operative connections between the sleeve and counter weight whereby the counter weight is opposed to the weight of the sleeve and spindle, means including a one-way clutch driven from said shaft for positively feeding the spindle downward and raising the counter weight, and means in engagement with the counterweight for forcing the counter weight downward to raise the spindle.

7. In a device of the class described, the combination of a frame, a tool carrying spindle rotatable and vertically slidable therein, means for rotating the spindle, a counter weight of less weight than the spindle vertically slidable in the frame, operative connections between the spindle and counter weight whereby the counter weight is opposed to the weight of the spindle, means including a one-way clutch for positively feeding the spindle downward, means in engagement with the counter weight for forcing the counter weight downward and raising the spindle, and adjustable means limiting the downward movements of the spindle and counter weight.

8. In a device of the class described, the combination of a frame, a tool carrying spindle rotatable and vertically slidable therein, means for rotating the spindle, a counter weight of less weight than the spindle vertically slidable in the frame, operative connections between the spindle and counter weight whereby the counter weight is opposed to the weight of the spindle, means including a one-way clutch for positively feeding the spindle downward, means in engagement with the counter weight for forcing the counter weight downward and raising the spindle, adjustable means for limiting the downward movement of the spindle, and adjustable means for limiting the downward movement of the counter weight.

9. In a device of the class described, the combination of a frame, a tool carrying spindle rotatable and vertically slidable therein, means for rotating the spindle, a counter weight of less weight than the spindle vertically slidable in the frame, operative connections between the spindle and counter weight whereby the counter weight is opposed to the weight of the spindle, means including a one-way clutch for positively feeding the spindle downward, means in engagement with the counter weight for forcing the counter weight downward and raising the spindle, manually controlled means for engaging the spindle feeding means, and means actuated automatically when the spindle has been fed a predetermined distance to disengage the feeding means.

10. In a device of the class described, the combination of a frame, a tool carrying spindle rotatable and vertically slidable therein, means for rotating the spindle, a counter weight of less weight than the spindle vertically slidable in the frame, operative connections between the spindle and counter weight whereby the counter weight is opposed to the weight of the spindle, means including a one-way clutch for positively feeding the spindle downward, means in engagement with the counter weight for forcing the counter weight downward and raising the spindle, manually controlled means for engaging the spindle feeding means, adjustable means for limiting the downward movement of the spindle, and means actuated automatically when the spindle has reached the limit of its downward movement to disengage the feeding means.

11. In a device of the class described, the combination of a frame, a tool carrying spindle rotatable and vertically slidable therein, means for rotating the spindle, a counter weight of less weight than the spindle vertically slidable in the frame, operative connections between the spindle and counter weight whereby the counter weight is opposed to the weight of the spindle, means including a one-way clutch for positively feeding the spindle downward, means for forcing the counter weight downward and raising the spindle, manually controlled means for engaging the spindle feeding means, and means actuated automatically when the spindle has been fed a predetermined distance to disengage the feeding means and operate the means for forcing the counter weight downward.

12. In a device of the class described, the combination of a frame, a tool carrying spindle rotatable and vertically slidable therein, means for rotating the spindle, a counter weight of less weight than the spindle vertically slidable in the frame, operative connections between the spindle and counter weight whereby the counter weight is opposed to the weight of the spindle, means including a one-way clutch for positively feeding the spindle downward, means for forcing the counter weight downward and raising the spindle, manually controlled means for engaging the spindle feeding means, means actuated automatically when the spindle has been fed a predetermined distance to disengage the feeding means and operate the means for forcing the counter weight downward, and adjustable means for limiting the downward movement of the counter weight.

13. In a device of the class described in combination with a frame, a tool carrying spindle mounted to rotate and slide vertically therein, a drive shaft for rotating the spindle, fluid pressure means operable to positively raise the spindle and hold it in raised position against a cushion provided by said fluid pressure, means for releasing the fluid pressure to thereby permit the spindle to be fed by gravity to the work, means driven from the drive shaft for positively feeding the spindle against the resistance of the work, adjustable means for limiting the downward movement of the spindle, means for automatically releasing the positive feeding means when the spindle has been fed to the limit of its downward movement, and adjustable means for limiting the upward movement of the spindle and automatically stopping the spindle when it has been raised to the desired limit of its upward movement.

14. In combination, a frame, a spindle slidable and rotatable therein, a rack slidable with the spindle, a cylinder on the frame, a piston in the cylinder, a rack connected to the piston, a gear engaging both of said racks, means for rotating the gear to feed the spindle downward and move the piston toward the cylinder head, and means for admitting fluid under pressure to the cylinder to force the piston from the cylinder head and raise the spindle.

15. In combination, a frame, a spindle slidable and rotatable therein, a rack slidable with the spindle, a cylinder on the frame, a piston in the cylinder, a rack connected to the piston, a gear engaging said racks, feed mechanism for rotating the gear in one direction to feed the spindle to the work and move the piston inward in the cylinder, means for disengaging the feed mechanism, and means for admitting fluid under pressure to the cylinder to force the piston outward and rotate the gear in the opposite direction to withdraw the spindle from the work.

16. In combination, a frame, a spindle slidable and rotatable therein, a rack slidable with the spindle, a cylinder on the frame, a piston in the cylinder, a rack connected to the piston, a gear engaging said racks, feed mechanism for rotating the gear in one direction to feed the spindle to the work and move the piston inward in the cylinder, adjustable means for limiting the feed of the spindle, means for disengaging the feed mechanism when the spindle reaches the limit of its feed, and means for admitting fluid under pressure to the cylinder to force the piston outward and withdraw the spindle from the work.

17. In combination, a frame, a spindle slidable and rotatable therein, a rack slidable with the spindle, a cylinder on the frame, a piston in the cylinder, a rack connected to the piston, a gear engaging said racks, feed mechanism for rotating the gear in one direction to feed the spindle to the work and move the piston inward in the cylinder, adjustable means for limiting the feed of the spindle, means for disengaging the feed mechanism when the spindle reaches the limit of its feed, means for admitting fluid under pressure to the cylinder to force the piston outward and withdraw the spindle from the work, and adjustable means for limiting the distance the spindle is withdrawn.

18. In combination, a frame, a spindle slidable and rotatable therein, a rack slidable with the spindle, a cylinder on the frame, a piston in the cylinder, a rack connected to the piston, a gear engaging said racks, feed mechanism for rotating the gear in one direction to feed the spindle to the work and move the piston inward in the cylinder, adjustable means for limiting the feed of the spindle, means for disengaging the feed mechanism when the spindle reaches the limit of its feed, means for admitting fluid under pressure to the cylinder to force the piston outward and withdraw the spindle from the work, adjustable means for limiting the distance the spindle is withdrawn, and means for automatically shutting off the supply of fluid to the cylinder when the spindle has been withdrawn.

19. In combination, a frame, a spindle slidable and rotatable therein, a rack slidable with the spindle, a cylinder on the frame, a piston in the cylinder, a rack connected to the piston, a gear engaging said racks, feed mechanism for rotating the gear in one direction to feed the spindle to the work and move the piston inward in the cylinder, adjustable means for limiting the feed of the spindle, means for disengaging the feed mechanism when the spindle reaches the limit of its feed, means for admitting fluid under pressure to the cylinder to force the piston outward and withdraw the spindle from the work, adjustable means for limiting the distance the spindle is withdrawn, means for automatically shutting off the supply of fluid to the cylinder when the spindle has been withdrawn, and manually operated means for releasing the fluid from the cylinder and engaging the feed mechanism to rotate the gear.

20. In combination, a frame, a spindle slidable and rotatable therein, a rack slidable with the spindle, a cylinder on the frame parallel to the spindle, a piston in the cylinder and connected to a rack, a feed shaft journaled in the frame, a gear on the shaft engaging both racks, driving means for rotating the shaft in one direction to feed the spindle downward and raise the piston in the cylinder, an adjustable index plate on the shaft carrying a stop, a valve controlling admission of a fluid under pressure to the cylinder, and means engaged by the stop to disengage the driving means and operate the valve to admit fluid to the cylinder to raise the spindle when the spindle has been fed downward a predetermined distance.

21. In combination, a frame, a spindle slidable and rotatable therein, a rack slidable with the spindle, a cylinder on the frame parallel to the spindle, a piston in the cylinder and connected to a rack, a feed shaft journaled in the frame, a gear on the shaft engaging both racks, driving means for rotating the shaft in one direction to feed the spindle downward and raise the piston in the cylinder, a stop rotatable with the shaft, a valve controlling admission of a fluid under pressure to the cylinder, and means engaged by the stop to disengage the driving means and operate the valve to admit fluid to the cylinder to raise the spindle when the spindle has been fed downward a predetermined distance.

22. In combination, a frame, a spindle slidable and rotatable therein, a rack slidable with the spindle, a cylinder on the frame parallel to the spindle, a piston in the cylinder and connected to a rack, a feed shaft journaled in the frame, a gear on the shaft engaging both racks, driving means for rotating the shaft in one direction to feed the spindle downward and raise the piston in the cylinder, a stop rotatable with the shaft, a valve controlling admission of a fluid under pressure to the cylinder, means engaged by the stop to disengage the driving means and operate the valve to admit fluid to the cylinder to raise the spindle when the spindle has been fed downward a predetermined distance, a second stop rotatable with the shaft, and means engaged by the second stop for closing the valve when the spindle has been raised a predetermined distance.

23. In combination, a frame, a spindle slidable and rotatable therein, a rack slidable with the spindle, a cylinder on the frame parallel to the spindle, a piston in the cylinder and connected to a rack, a feed shaft journaled in the frame, a gear on the shaft engaging both racks, driving means for rotating the shaft in one direction to feed the spindle downward and raise the piston in the cylinder, a stop rotatable with the shaft, a valve controlling admission of a fluid under pressure to the cylinder, means engaged by the stop to disengage the driving means and operate the valve to admit fluid to the cylinder to raise the spindle when the spindle has been fed downward a predetermined distance, a second stop rotatable with the shaft, means engaged by the second stop for closing the valve when the spindle has been raised a predetermined distance, and means for adjusting the position of the stops relative to the shaft whereby the limits of movement of the spindle in each direction may be varied.

24. In combination, a frame, a spindle slidable and rotatable therein, a rack slidable with the spindle, a cylinder on the frame parallel to the spindle, a piston in the cylinder and connected to a rack, a feed shaft journaled in the frame, a gear on the shaft engaging both racks, an index head on the shaft, two index plates adjustable on the head and each carrying a stop, a feed drive shaft mounted on the frame and movable into operative engagement with the feed shaft to rotate the shaft in one direction and feed the spindle downward, a valve controlling admission of fluid under pressure to the cylinder, a lever for moving the driving means into engagement with the feed shaft and opening the valve to release the pressure in the cylinder, means controlled by one of said stops to release said driving means and actuate said valve to admit fluid under pressure to said cylinder when the spindle has been fed a predetermined distance, and means actuated by the other of said stops to close said valve when the spindle has been retracted a predetermined distance.

In testimony whereof I affix my signature.
HERMAN H. FERNSTROM.